June 4, 1940. J. P. SPANG 2,203,603
MACHINE FOR SLITTING MEAT
Filed Oct. 18, 1935 2 Sheets-Sheet 1
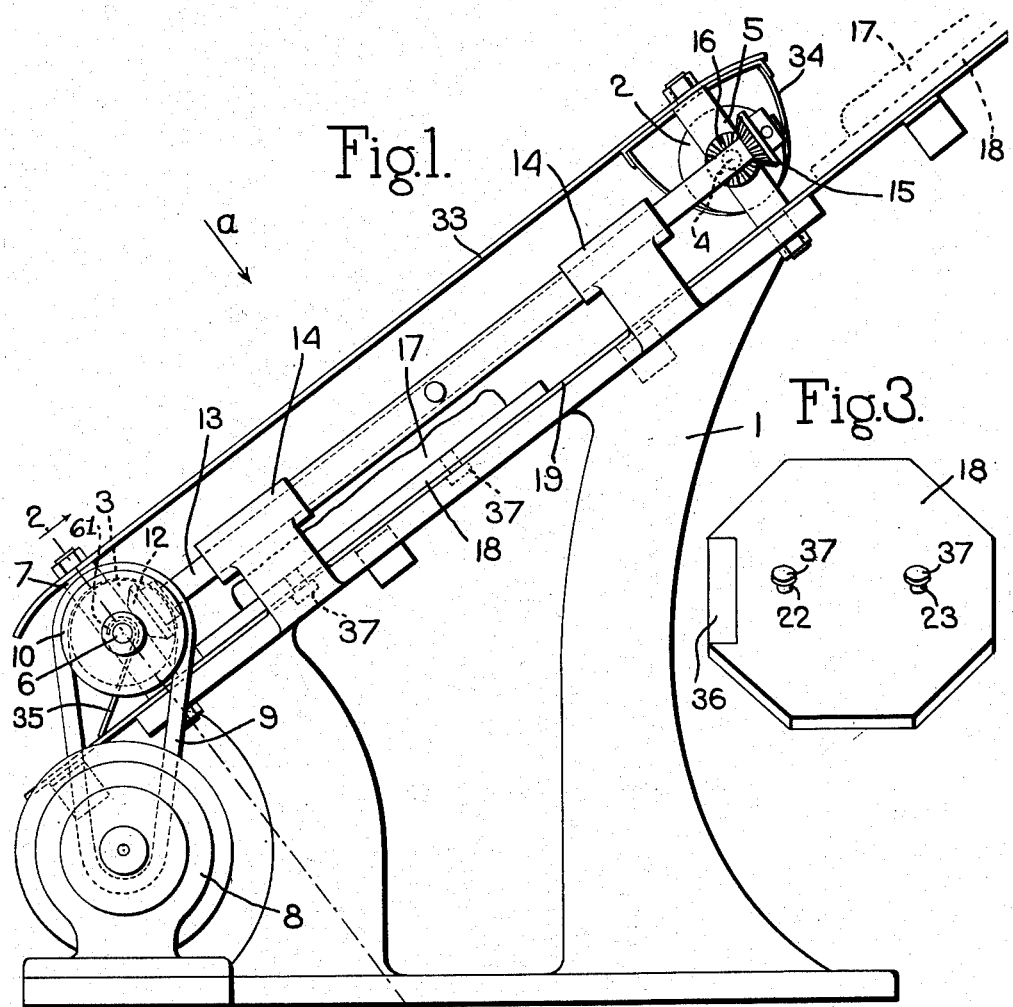
Inventor.
Joseph P. Spang
by Heard Smith & Tennant
Attys.

June 4, 1940.　　　　J. P. SPANG　　　　2,203,603
MACHINE FOR SLITTING MEAT
Filed Oct. 18, 1935　　　　2 Sheets-Sheet 2
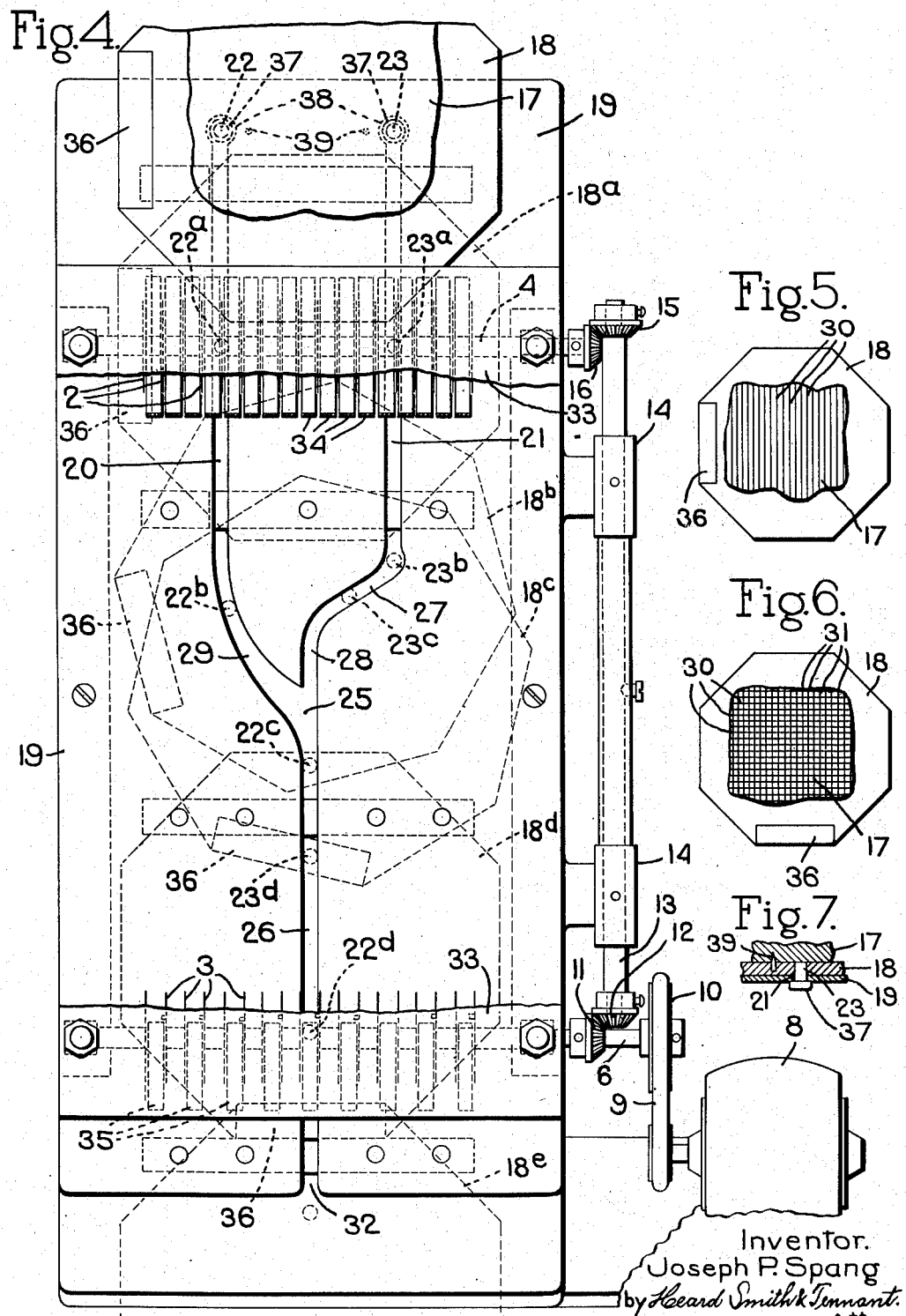
Inventor.
Joseph P. Spang
by Heard Smith & Tennant.
Attys.

Patented June 4, 1940

2,203,603

UNITED STATES PATENT OFFICE 2,203,603

MACHINE FOR SLITTING MEAT

Joseph P. Spang, Quincy, Mass., assignor to Cube Steak Machine Company, Inc., Boston, Mass., a corporation of Massachusetts Application October 18, 1935, Serial No. 45,609

10 Claims. (Cl. 17—25)

This invention relates to a machine for slitting meat and especially to a meat-slitting machine constructed to cut in a slice of meat two series of slits with the slits of each series crossing those of the other slits.

One object of the invention is to provide a novel meat-slitting machine which is equipped with a supporting platform, a set of power-driven rotary knives above the platform and a meat-supporting plate separable from the machine and adapted to slide over the platform from a position in which it is entirely on one side of the knives, completely past the knives, to a position at the other end of the platform where it is entirely on the other side of the knives, and to be discharged from said platform at said other end thereof, said plate preferably being of such a thickness that when it passes beneath the knives the upper surface thereof will not be penetrated by the knives.

A further object of the invention is to provide a meat-slitting machine of the above type which is formed with means to apply a retarding force to the forward movement of the meat-supporting plate while the knives are slitting the meat thereon, whereby the speed of the forward movement of said plate is reduced below the surface speed of the knives, and the latter will operate on the meat with a draw cut.

A further object of the invention is to provide a novel meat-slitting machine which includes two sets of power-driven knives having a tandem arrangement with a platform beneath the knives and a meat-supporting plate separable and removable from the machine and adapted for free sliding movement from one end of the platform to the other, thereby to carry a slice of meat under the two sets of knives successively.

A further object of the invention is to provide a meat-slitting machine such as above-described with means for giving the meat-supporting plate a turning movement after it has passed the knives of the first set and before it reaches the knives of the second set.

With this arrangement the series of slits which are cut in the meat by the second set of knives will cross those which are cut in the meat by the first set of knives, and if the meat-supporting plate makes a 90° turn the slits made by the second set of knives will be at right angles to those made by the first set of knives.

Another feature of my invention relates to the novel construction whereby the action of gravity is made use of in feeding the meat-supporting table past the knives and whereby the action of gravity is also made use of to give the plate its turning movement after it passes the knives of the first set and before it reaches the knives of the second set.

With this construction the slitting of the meat is accomplished by placing the slice of meat on the meat-supporting plate and then placing the plate at the upper end of the machine and allowing it to gravitate downwardly past the two sets of knives.

I will preferably employ rotary disk knives for cutting the slits in the meat although knives of any suitable character may be used.

In order to give an understanding of the invention I have illustrated in the drawings a selected embodiment thereof which will now be described after which the novel features will be pointed out in the appended claims.

In the drawings;

Fig. 1 is a side view of a meat-slitting machine embodying my invention.

Fig. 2 is a section on the line 2—2, Fig. 1, the knives and stripper fingers 35 being shown in elevation.

Fig. 2a is a section on the line 2a—2a, Fig. 2.

Fig. 3 is an under side perspective view of the meat-supporting plate.

Fig. 4 is a plan view of the machine looking in the direction of the arrow a in Fig. 1.

Fig. 5 is a view of the meat-supporting plate with the meat thereon showing the slits cut by the knives of the first set.

Fig. 6 is a view of the meat-supporting plate with the meat thereon showing the meat after both series of slits have been cut therein.

Fig. 7 is a fragmentary sectional view.

The device herein shown comprises a suitable frame 1 on which is mounted two sets of meat-slitting knives indicated at 2 and 3. These knives are preferably rotary disk knives and the knives 2 are shown as mounted on a shaft 4 which is journalled in suitable bearings 5 carried by the frame 1. The knives 3 are mounted on a shaft 6 which is supported in suitable bearings 7 also carried by the frame 1.

Suitable means are herein illustrated for rotating the knives and for this purpose I have shown a motor 8 which is connected by a suitable driving belt 9 to a pulley 10 on the shaft 6. The shaft 6 has a beveled gear 11 thereon which meshes with a beveled gear 12 on a shaft 13 that is mounted in suitable bearings 14 carried by the frame and said shaft 13 has a beveled gear 15 thereon meshing with a beveled gear 16 fast on the shaft 4.

Any other suitable means for rotating the two sets of knives may be employed, however, without departing from the invention.

The slice 17 of meat to be slit is supported on a meat-supporting plate 18 which is separable from the machine and which is constructed to have a free sliding movement over the platform 19 from one end to the other thereof, thereby to carry a slice of meat past the knives. This free sliding movement of the plate is uncontrolled mechanically and the plate may thus be fed forward at a speed which is independent of the rotary movement of the knives.

The knives are preferably rotated in a direction in which the portions of the cutting edges of the knives that are acting on the meat supported on the plate 18 are traveling in the same direction as the feeding movement of the plate, whereby the action of the knives on the meat provides a part at least of the force applied to the plate for moving it forwardly over the platform.

Means are also preferably provided for giving the meat-supporting plate 18 a turning movement after it has passed the knives 2 and before it reaches the knives 3 so that the slits which are cut by the knives 3 will cross or have an angular relation to the slits which are cut by the knives 2.

In the illustrated embodiment of the invention the platform 19 is placed in an inclined position and during the operation of the machine the meat-supporting plate 18 with a slice 17 of meat thereon is placed manually on the upper end of the platform 19 and it then has a free sliding movement from the upper end to the lower end of the platform, during which free sliding movement the meat on the plate is carried past the two sets of knives successively.

The platform 19 is provided at its upper end with two guiding slots 20 and 21 and the meat-supporting table 18 is provided on its under side with two pins or projections 22, 23 which fit and travel in said slots 20 and 21 and thus guide the plate 18 in its free sliding movement beneath the knives 2. In view of the fact that the platform 19 has an inclined position the action of gravity on the plate 18 and meat 17 will be a factor in giving the plate its free sliding movement over the platform.

The guiding grooves in the platform 19 are so shaped that after the meat-supporting plate 18 has moved past the knives 2 said plate will be given a 90° turning movement so that the slits which are cut in the meat by the knives 3 will be at right angles to those which are cut by the knives 2.

As shown in Fig. 4 the slots 20 and 21 merge at 25 into a single slot 26. The slot 21 extends inwardly as shown at 27 and then extends downwardly as shown at 28 to meet the slot 20, the latter having the gradual inwardly-curved portion 29 which meets the portion 28 of the slot 21 at the point 25.

The manner in which the plate 18 is turned in passing from one set of knives to the other is best illlustrated in Fig. 4. The meat-supporting plate 18 is separable from the platform and in using the device said plate will be placed in position on the platform with the projections 22, 23 occupying the upper ends of the slots 20, 21, as shown in Fig. 4, and a slice 17 of meat is placed on the plate 18. When the plate is released it moves downwardly over the platform 19 by gravity and as it passes underneath the knives 2 the latter will cut the slits 30 in the meat as indicated in Fig. 5. The dotted line position 18a in Fig. 4 shows the plate 18 as it is passing the knives 2.

When the plate 18 reaches the dotted line position 18b the pin 23 has reached the lower end of the straight portion of the slot 21 and rests against the wall of the slot at the angle between the straight portion 21 and the inwardly-extending portion 27. The pin 22, however, continues to move downwardly through the curved portion 29 of the slot as indicated at 22b and during this movement the pin 23, which is in the position shown at 23b, acts as a fulcrum about which the plate 18 is turned. When the pin 22 reaches the meeting point 25 of the two slots said pin will then continue its downward movement through the slot 26, as shown at 22c, and the pin 23 will move along the inclined portion 27 of the slot as indicated at 23c. The position of the plate at this time is indicated by the dotted line position 18c. As the plate 18 continues its downward movement both pins 22, 23 pass into the slot 26 as indicated at 22d and 23d and said plate then continues its gravitational movement past the lower set of knives 3. During the passage of the pins 22, 23 from the two slots 20, 21 into the common slot 26 the table 18 will have been given a turning movement of 90° and as a result the slits 31 which are cut in the meat 17 by the knives 3 will be at right angles to the slits 30 which were cut in the meat by the knives 2.

The lower end of the common slot 26 is open as shown at 32 and as the plate 18 passes out from under the second set of knives 3 the pins will pass out of the groove and the plate with the meat thereon is discharged from the machine. The slit slice of meat is then removed from the plate. An unslit slice may then be laid on the plate and the latter placed on the upper end of the platform as shown in full lines Fig. 4 and the above operations repeated.

With this device, therefore, the slitting of the meat involves merely placing the slice of meat on the table 18 and then placing the table on the platform at the upper end thereof with the pins 22, 23 occupying the grooves 20, 21 and allowing the plate to gravitate downwardly to and off from the lower end of the platform.

In order to assist the turning movement of the plate 18 I may provide said plate with a weight 36 in the edge nearest the pin 22. When the plate reaches the dotted line position 18b the action of gravity on the weight 36 assists in turning the plate from the dotted line position 18b into the dotted line position 18c. The pins 22, 23 are shown as provided with heads 37 which engage the under side of the platform and prevent the pins from being withdrawn from the slots during the travel of the plate from the top to the bottom of the platform. The upper ends of the slots 20 and 21 are enlarged as shown at 38 to receive the heads 37 when the plate is being placed on the platform. The pins 22, 23 and the slots 20, 21, 26 provide what might be termed a free securing connection between the plate 18 and the platform, these pins serving to retain the plate on the platform during its feeding movement while permitting it to have the free mechanically uncontrolled sliding movement over the platform.

The plate 18 is also shown as having retaining pins 39 in its upper surface on which the slice 17 of meat is impaled and which serve to retain the meat on the plate while it is traveling downwardly along the platform and while the plate is being turned. These pins 39 are so placed that each pins passes between two adjacent knives during the downward travel of the platform. If desired some suitable stripping means may be employed for preventing the meat from sticking to the knives. The platform and the knives are shown as covered by a suitable protecting plate or cover 33 which is carried by the bearings 5 and 7. The knives 2 have associated therewith thin flexible U-shaped strips of metal 34, each of which is connected at its ends to the cover plate 33. These strippers 34 yield upwardly as the meat passes beneath the knives and by their pressure against the meat they not only prevent the latter from sticking to the knives, but also apply a retarding force to the forward movement of the meat-supporting plate with the meat thereon which insures that the knives will act on the meat with a draw cut. In order to properly slit the meat with rotary knives it is highly desirable that the knives should act on the meat with the draw cut for if the meat moves under the knives at a speed approximately that of the surface speed of the knives the knives will merely have a rolling action over the meat, and if the meat has sinews or gristly portions the knives are apt to roll over the meat without properly slitting it. The strippers 34, however, apply sufficient retarding force to the forward movement of the meat so that when the knives are acting on the meat the latter is moving forwardly at a speed considerably slower than the surface speed of the knives, as a result of which the knives operate with a draw cut.

The knives 3 are also shown as provided with strippers in the form of stripping fingers 35 which are pivotally mounted on the shaft 6, the upper end of each finger being bent into a partial loop 61 which partially encircles the shaft 6. These fingers extend forwardly and their ends rest on the platform but their pivotal connection with the shaft 6 allows them to swing away from the platform as the meat passes thereunder. The swinging movement of the stripper fingers 35, however, is limited by the end of the cover plate 33, and if the slice 17 of meat tends to stick to the knives 3, the stripper fingers 35 will be brought into engagement with the end of the cover plate 33, and when in this position, will strip the meat from the knives.

In the device herein illustrated the meat-supporting plate 18 has a free movement over the platform 19 and beneath the knives, which movement is independent of the rotative movement of the knives, that is, the meat-supporting plate is not geared to the knives to move in timed relation therewith. Hence the speed at which the table 18 is moved past the knives has no relation to the speed of rotation of the knives.

While it is intended that the action of gravity will normally be sufficient to give the table its movement past the knives, yet since the table has a free movement over the platform it is possible for the operator to apply some force to the table if desired to assist its movement past the knives. Although in the illustrated embodiment of the invention there are two sets of rotary knives having a tandem arrangement, yet the invention is not limited to the use of two sets of knives as in its broader aspect it covers a meat-slitting machine having rotary slitting knives above a stationary platform, a meat-supporting plate separable from the platform and adapted to slide the full length of the platform from a position at one end thereof and on one side of the knives, completely past the knives, to a position at the other end of the platform on the opposite side of the knives and to be discharged from the platform at said other end, said plate being of a thickness whereby when it passes beneath the knives the upper surface thereof will not be penetrated by the knives. Furthermore although in the illustrated embodiment of the invention the supporting platform over which the meat-supporting plate slides is shown as having an inclined position, yet the invention is not limited to a machine in which the platform does have an inclined position.

It will be understood that various changes may be made in the constructional details of the devices without departing from the invention.

I claim:

1. A meat-slitting machine comprising an inclined supporting platform having guiding slots, two sets of slitting knives situated above the platform, a meat-supporting plate movable downwardly over the platform and beneath the knives, said plate having guiding pins operating in said slots.

2. A meat-slitting machine comprising an inclined supporting platform having guiding slots, two sets of slitting knives situated above the platform, a meat-supporting plate movable by gravity downwardly over the platform and beneath the knives, said plate having guiding pins operating in said slots and said slots being constructed to give the plate a turning movement after it has passed the upper set of knives and before it reaches the lower set of knives.

3. A meat-slitting machine comprising an inclined supporting platform having guiding slots, a set of rotary slitting knives situated above the platform, means to rotate said knives, a meat-supporting plate movable by gravity downwardly over the platform and beneath the knives, said plate having guiding pins operating in said slots and each pin having a head which underlies the platform and retains the pin in its slot.

4. A meat-slitting machine comprising a supporting platform, two sets of slitting knives situated above the platform and having a tandem arrangement, means to rotate the knives, a meat-carrying plate separable from the machine and having a free securing connection to and sliding movement over the platform in the direction of the length of the platform, and means for guiding the plate during its free sliding movement and to give it a turning movement after it passes one set of knives and before it reaches the other set of knives.

5. A meat-slitting machine comprising a stationary inclined platform, two sets of slitting knives situated above the platform and having a tandem arrangement, a meat-supporting plate separable from the platform and having a free securing connection to and gravitational movement from the upper end of the platform to the lower end thereof, and means to give the plate a turning movement after it passes the knives of the first set and before it passes the knives of the second set.

6. A meat-slitting machine comprising a platform, a set of rotary slitting knives above the platform, power mechanism to rotate said knives, and a meat-supporting plate separable from the platform provided with guiding pins, guiding means on the platform cooperating with said pins, said plate being free to slide the full length of the platform from a position at one end thereof in which it is entirely on one side of the knives, completely past the knives, and to a position at the other end of the platform where it is entirely on the other side of the knives, and to be discharged from said platform at the said other end thereof.

7. A meat-slitting machine comprising a stationary platform, rotary slitting knives above the platform, a meat-supporting plate separable from the platform provided with guiding pins, guiding means on the platform cooperating with said pins, said plate having a sliding movement over the platform from a position at one end of the platform and on one side of the knives, completely past the knives, to a position at the other end of the platform on the opposite side of the knives and also free to be discharged from the platform at said other end, and power mechanism to rotate the knives in such a direction that the portion of each knife edge which is acting on the meat supported on the plate is traveling in the same direction as the plate, whereby the action of the knives on the meat provides part at least of the force required to give the plate its free sliding feeding movement over the platform.

8. A meat-slitting machine comprising a platform, a set of rotary slitting knives above the platform, means to rotate the knives, a meat-supporting plate separable from the platform, said plate being of a thickness whereby when it passes beneath the knives the upper surface thereof will not be penetrated by the knives and being adapted to slide the full length of the platform from a position at one end thereof in which it is entirely on one side of the knives to a position at the other end of the platform where it is entirely on the other side of the knives and to be discharged from the platform at said other end, and means to apply a retarding force to the forward movement of the meat-supporting plate while the knives are slitting the meat thereon whereby the speed of the forward movement of said plate is reduced below the surface speed of the knives and the latter will operate on the meat with a draw cut.

9. A meat-slitting machine comprising a stationary platform, rotary slitting knives above the platform, a meat-supporting plate separable from the platform, said plate being of a thickness whereby when it passes beneath the knives the upper surface thereof will not be penetrated by the knives and being adapted to move over the platform from a position at one end of the platform and on one side of the knives, completely past the knives, to a position at the other end of the platform on the opposite side of the knives and also free to be discharged from the platform at said other end, and power mechanism to rotate the knives in such a direction that the portion of each knife edge which is acting on the meat supported on the plate is traveling in the same direction as the plate, whereby the action of the knives on the meat provides part at least of the force required to give the plate its free sliding feeding movement over the platform, and a stripper associated with the knives and adapted to press the meat against the plate during the slitting operation and thus apply a retarding force to the knife-induced forward movement of the plate to reduce the speed of such forward movement sufficiently below the surface speed of the knives so that the latter will operate on the meat with a draw cut.

10. A meat-slitting machine comprising a platform, a set of rotary slitting knives above the platform, means to rotate the knives, and a meat-supporting plate separable from the platform and adapted to have free sliding movement over the platform the full length thereof from a position at one end of the platform in which it is entirely on one side of the knives to a position at the other end of the platform where it is entirely on the other side of the knives and to be discharged from the platform at said other end, said plate being of a thickness whereby when it passes beneath the knives the upper surface thereof will not be penetrated by the knives.

JOSEPH P. SPANG.